(12) United States Patent
Castle et al.

(10) Patent No.: US 6,582,808 B2
(45) Date of Patent: Jun. 24, 2003

(54) MULTILAYER PAPERBOARD PACKAGING STRUCTURE INCLUDING POLYOLEFIN/POLYAMIDE BLEND LAYER

(75) Inventors: Gregory J. Castle, Wilder, KY (US); Dolan R. Johnson, Bay Minette, AL (US); Keith S. Shih, Loveland, OH (US); A. Craig Bushman, Loveland, OH (US)

(73) Assignee: International Paper Company, Tuxedo Park, NY (US)

( * ) Notice: Subject to any disclaimer, the term of this patent is extended or adjusted under 35 U.S.C. 154(b) by 0 days.

(21) Appl. No.: 09/918,521

(22) Filed: Aug. 1, 2001

(65) Prior Publication Data

US 2002/0051873 A1 May 2, 2002

Related U.S. Application Data

(60) Provisional application No. 60/227,589, filed on Aug. 25, 2000.

(51) Int. Cl.[7] ............................. B32B 7/02; B32B 23/06
(52) U.S. Cl. ...................... 428/213; 428/219; 428/220; 428/341; 428/342; 428/475.8; 428/476.1; 428/476.3; 428/476.9; 428/479.3; 428/479.6; 428/512; 428/513; 428/514

(58) Field of Search ............................... 428/34.2, 34.3, 428/213, 219, 220, 341, 342, 479.3, 479.6, 512, 513, 514, 476.3, 476.9, 475.8, 476.1

(56) References Cited

U.S. PATENT DOCUMENTS

| | | | |
|---|---|---|---|
| 5,175,036 A | 12/1992 | Smiley et al. | 428/36.7 |
| 5,403,667 A | * 4/1995 | Simoens | 428/479.6 |
| 5,958,534 A | 9/1999 | Marbler et al. | 428/36.6 |

* cited by examiner

Primary Examiner—D. S. Nakarani
(74) Attorney, Agent, or Firm—Hoffman, Wasson & Gitler; Melvin D. Fletcher

(57) ABSTRACT

A packaging laminate for a container which enables a blend monolayer to be effectively extrusion coated onto the paperboard substrate as the product contact layer without the need for tie layers or multilayer co-extrusion equipment. The blend monolayer has superior oxygen transmission resistance and has excellent pinhole resistance compared to straight polyethylene monolayer. The product contact layer consists of a blend of a polyolefin polymer, a polyamide, and a compatibilizer in a preferred embodiment. The monolayer blend is a low cost alternative to multilayer structures.

17 Claims, 2 Drawing Sheets

MULTILAYER PAPERBOARD PACKAGING STRUCTURE INCLUDING POLYOLEFIN/ POLYAMIDE BLEND LAYER

The instant application claims the priority of U.S. provisional patent application Ser. No. 60/227,589, filed Aug. 25, 2000.

FIELD OF THE INVENTION

This invention relates to packaging cartons made from multilayer laminates containing paperboard and at least one layer of polymer blends of polyolefins and polyamides.

BACKGROUND OF THE INVENTION

The most recent improvement in the packaging structure for milk requires a multilayer coextrusion process onto a paperboard substrate as the product contact layer which includes Nylon 6/tie layer/low density polyethylene. This multilayer can be coextruded online and thereby produce a coated substrate. The multilayer coextrusion of Nylon 6/tie layer/low density polyethylene provides oxygen barrier, sealing, strength, and pinhole resistance though it can only be coextruded on very specific coextrusion apparatus.

There is a specific need to develop a barrier material that can be extruded on the product contact side of a paperboard package as a monolayer which has the performance of the multilayer. This approach will produce a lower cost structure verses the multilayer co-extrusion line economics.

SUMMARY OF THE INVENTION

According to the present invention, there is provided a polymer blend of a polyamide and a polyolefin, such as Nylon 6 and low density polyethylene, with other required or optional components, that is extruded as a monolayer on the product contact side of a paperboard packaging structure.

The structure improves pinhole resistance as well as oxygen barrier properties over the commercial monolayer structure and produces an improved structure with better bulge resistance via the monolayer extrusion coating process.

DETAILED DESCRIPTION OF THE INVENTION

Figure 1:
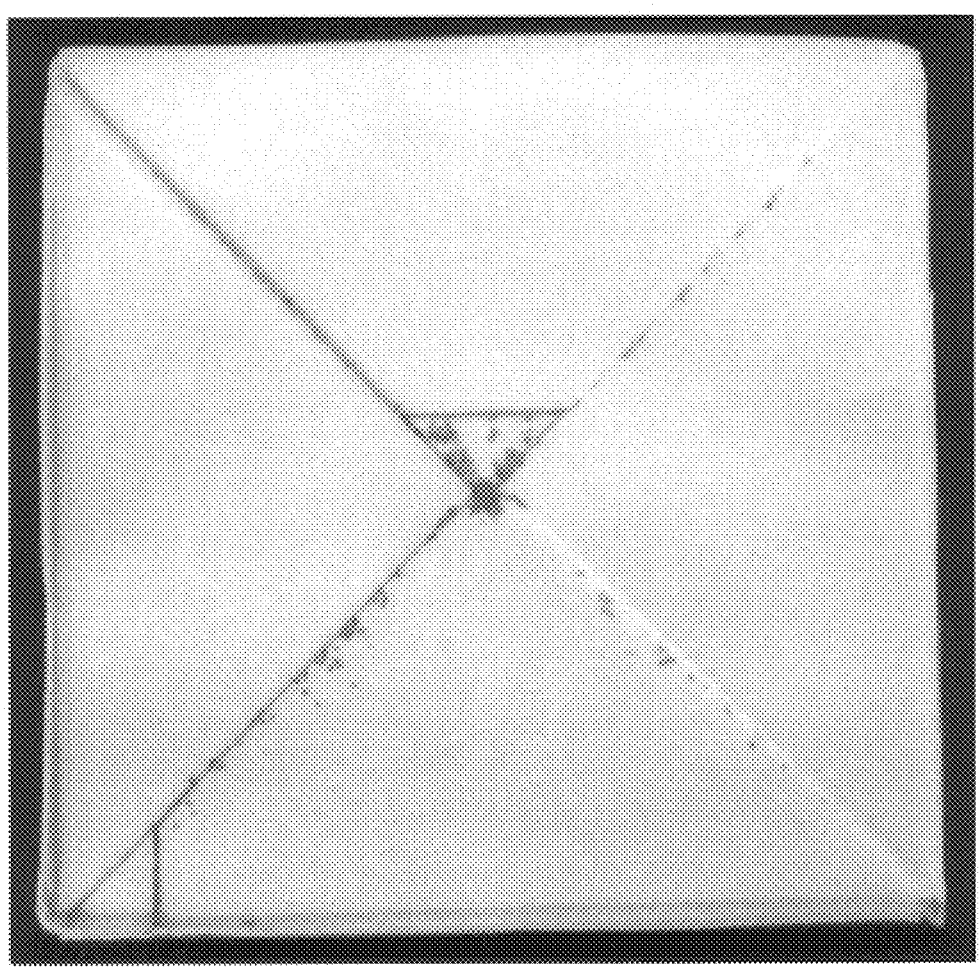
FIG. 1 is a photograph of the bottom portion of a control carton after red dye pinhole resistance test has been performed.

The invention focuses on a monolayer polyolefin/ polyamide blend layer used in a paperboard packaging laminate structure. An appropriate compatibilizer such as maleic anhydride modified polyethylene enables the extrusion of a blend of Nylon 6 and low density polyethylene onto a paperboard substrate. The composition range for the extrusion includes up to approximately 40% by weight of the polyamide with the use of the maleic anhydride functionalized compatibilizer. Utilizing other compatibilizers, the range of the weight percent of the polyamide can exceed 40 wt.%. A particularly desired starting material blend would include Nylon 6 and low density polyethylene.

A structure which includes 12 lbs. per 3,000 square foot (approximately 20 grams per square meter) of low density polyethylene as the outside printed layer; 265 lbs. per 3,000 square foot (approximately 432 grams per square meter) paperboard substrate; 25–30 lbs. Per 3,000 square foot (approximately 41–49 grams per square meter) of the blend of Nylon 6 and low density polyethylene with the compatibilizer is provided. This is a preferred structure though it is not limiting in the disclosure. The melt blending process is achieved in two ways:

(1) Inside the Extruder of the Extrusion Coating Line.

In this case, the resins and the compatibilizer are dry blended first and then fed into the hopper of the extruder. Alternatively, one can use gravimetric feeders to feed each ingredient into the hopper at the appropriate proportions.

(2) Using a Separate Extruder (Single Screw or Twin Screw) to Make the Blend First (Preferably into a Pellet Form) and Then the Blend Pellets are Fed into the Hopper of the Extruder for Extrusion Coating.

Typical processing temperatures for monolayer extrusions of low density polyethylene can be employed to extrusion coat the novel blends onto the paperboard.

The polyamides used in the invention are Nylon 6, Nylon 6-6, Nylon 6-10, amorphous nylon, MXD6 nylon, or the like. Nylon 6 is a preferred component. The polyolefins used include low density polyethylene, high density polyethylene, metallocene polyethylene, linear low density polyethylene, polypropylene, or metallocene polypropylene.

The compatibilizer used is maleic anhydride modified polyethylene. Other types of polymers that can be used as compatibilizers include: metal neutralized ethylene methacrylic acid copolymer (Surlyn®), ethylene acrylic acid copolymer (Primacor®), ethylene methacrylic copolymer (Nucrel®), maleic anhydride modified polypropylene (Oravac®), epoxy functionalized polyethylene or epoxy functionalized polypropylene (Lotader®).

The paperboard substrate used may have a base weight within the range of 140 lbs. to 300 lbs. per 3,000 square foot (approximately 228 to 489 grams per square meter). For polyethylene polymers, the melt flow index ranges between 1 and 15. For polypropylene polymers, the melt flow rate is between 4 and 60.

Optionally, one can add fillers into the blends to increase the stiffness or barrier property. These fillers can be calcium carbonate, talc, mica, clay, or the like. One can add the filler during the blending process in the extruder. Alternatively, one can take a polymer which contains a predispersed filler and blend it with another polymer. For instance, one can melt blend calcium carbonate filled low density polyethylene with Nylon 6. Similarly, one can melt blend talc filled Nylon 6 with low density polyethylene. One particular preferred embodiment includes Nylon 6 with nanoclay and low density polyethylene due to the fine dispersion of the clay particles which impart barrier and mechanical properties to the blend. Further, one can add a fourth polymeric component into the blends instead of fillers in order to tailor the properties of the blends.

In an alternate embodiment of the invention provided is a paperboard packaging laminate for a container comprising a paperboard substrate, a blend layer of a polyamide polymer and a polyolefin polymer coated onto said paperboard substrate, wherein the blend layer corresponds to an exterior layer when the laminate is formed into the container.

A container having a preferred structural embodiment was produce and it was tested and compared against a control as depicted in the following examples:

EXAMPLE 1

A blend of low density polyethylene or LDPE (65 wt %), a polyamide (Nylon 6) (30 wt %) and a compatibilizer (5 wt %), was extrusion coated onto a paperboard substrate with a base weight of 265 lbs. per 3,000 square foot (approximately 432 grams per square meter) as the product contact layer.

A control structure was also made which consisted of one layer of LDPE as the product contact layer. In both structures, the outside printed layer consisted of a layer of LDPE. The oxygen transmission rate (OTR) of these two coated paperboards was measured via a MOCON OX-TRAN Model 2/20 machine at 23° C. and 50% RH. In order to directly compare the data, the coat weights for both samples are the same. The results are listed in Table 1.

TABLE 1

OTR results from the two samples

|  | Control Board | Experimental Board with the Blend on the Matte Side |
|---|---|---|
| OTR (cc/100 in² - day) | 106 | 66 |

The incorporation of nylon 6 in the blend improves the OTR of the coated paperboard substantially. It is one advantage of the blend versus the straight LDPE.

EXAMPLE 2

A blend of low density polyethylene or LDPE (65 wt %), a polyamide (Nylon 6) (30 wt %), and a compatibilizer (5 wt %) was directly extrusion coated onto the paperboard with a base weight of 265 lbs. per 3,000 square foot (approximately 432 grams per square meter) in the pilot line as the product contact layer. The three components were dry blended in a cement mixer for at least two minutes and then fed into the extruder hopper. A control structure was also made by extrusion coating straight LDPE onto the paperboard substrate as the product contact layer. In both structures, the outside printed layer consisted of one layer of LDPE. The coated paperboard was then converted into blanks with J bottom and these blanks were formed into half-gallon size cartons using an Evergreen filling machine. The pinhole resistance dye test was performed on these two types of cartons using the Scarlett Moo red dye aqueous solution. The red dye solution was first poured into the empty carton for one minute, then the dye solution was poured out of the carton. The carton was then rinsed thoroughly with running tab water for a few minutes. The carton was finally left in the open air to dry.

Figure 2:
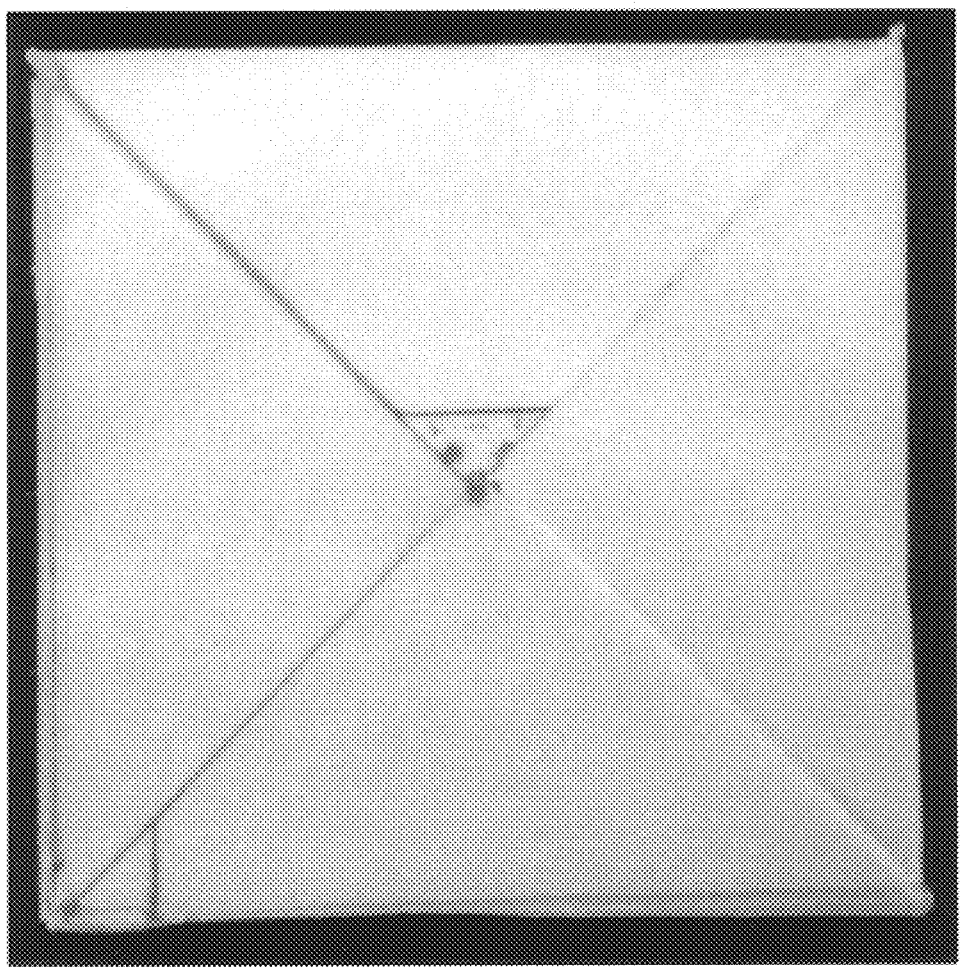
FIG. 2 is a photograph of the bottom portion of a carton embodying a preferred structure of the invention after red dye pinhole resistance test has been performed.

Because the red dye penetrates into the fiber readily if there are pinholes on the coating, it will leave a mark in the form of red dots after it is dried. By judging from the degree of red dot formation, one can evaluate the pinhole resistance of the cartons. The control carton with LDPE on the matte side exhibits very severe amount of pinholing, primarily due to intensive heat during the carton formation (FIG. 1). The experimental structure with the LDPE/nylon 6 blend on the matte side exhibited a much less degree of pinholing (FIG. 2).

EXAMPLE 3

A milk filling trial was carried out at a dairy packaging facility to evaluate the performance of the cartons with LDPE/nylon 6 blend as the product contact layer. The paperboard substrate had a base weight of 265 lbs. per 3,000 square foot (approximately 432 grams per square meter). The control sample with LDPE as the product contact layer was also included in this trial. In both structures the outside printed layer consisted of a layer of LDPE. Both structures have the J bottom and the side seam in both was skived. The 2% UHT (ultra high temperature) milk was filled into the cartons using the Evergreen EH-1 filler under the normal commercial operating conditions. These cartons were then packed in corrugated boxes and stacked on the standard pallet and shipped back to our laboratory located in Cincinnati, Ohio. The performance evaluation tests include bulge and flavor panel. The bulge resistance test was done at our laboratory. The flavor panel was conducted at an outside independent lab with trained panelists. These tests were carried out periodically until week 12 or week 13.

The samples for the bulge resistance test were left free standing and stored in the cold room at 4° C. The average bulge (gable to gable distance and the side to side distance) of the cartons was measured in terms of 1/32 inch relative to the perfectly square or non-bulged cartons. The results are listed in Table 2.

TABLE 2

Bulge resistance test results (expressed in terms of 1/32 inch)

| Time, week | 0 | 1 | 2 | 3 | 4 | 5 | 6 | 7 | 8 | 9 | 10 | 11 | 12 |
|---|---|---|---|---|---|---|---|---|---|---|---|---|---|
| Control | 4.6 | 9.5 | 12.8 | 14.4 | 15.2 | 16.1 | 17 | 18 | 18.8 | 19.1 | 19.6 | 19.8 | 20 |
| Experimental | 4.8 | 9.1 | 12 | 13.3 | 14.6 | 15.2 | 15.9 | 17.1 | 17.8 | 18.2 | 18.6 | 18.5 | 18.5 |

EXAMPLE 4

The 2% UHT milk stored in the cartons produced in the fill trial as described in Example 3 was evaluated for its flavor periodically at an outside laboratory. The test was performed by placing the cartons into a refrigerated chamber which contained offensive produce odors. These produce includes onions, ripe apple, and ripe bananas. The trained panelist ranked the flavor of the milk based on a 0 to 100 scale with 0 being the worst. The panelists also gave a brief description on the taste attributes of the tested samples. The results are shown in Table 3.

TABLE 3

The taste panel results from the outside trained panelists

| Time, week | Week 3 | Week 5 | Week 9 | Week 13 |
|---|---|---|---|---|
| Control | 80 (creamy, dairy, slight board flavor) | 60 (board flavor, off flavor, onion/produce) | 40 (off flavor, produce) | 20 (off flavor, onion, unacceptable) |
| Experimental | 80 (clean, creamy, dairy) | 100 (creamy, dairy) | 80 (clean, creamy, dairy) | 80 (clean, creamy, dairy, slight board flavor) |

It is to be understood that variations and modifications of the present invention may be made without departing from the scope of the invention. It is also understood that the scope of the invention is not to be interpreted as limited to the specific embodiments disclosed herein.

We claim:

1. A paperboard packaging laminate for a container comprising:
   a) a paperboard substrate; and
   b) a blend layer of a polyamide polymer and a polyethylene polymer coated onto said paperboard substrate, wherein the blend layer corresponds to a product contact layer when the laminate is formed into the container.

2. The paperboard packaging laminate for a container in accordance with claim 1, the blend layer further comprising a compatibilizer.

3. The paperboard packaging laminate for a container in accordance with claim 2, wherein the blend layer is extrusion coated onto the paperboard substrate.

4. The paperboard packaging laminate for a container in accordance with claim 2, wherein the blend layer comprises approximately 65% by weight polyolefin polymer, approximately 30% by weight polyamide polymer and approximately 5% by weight compatibilizer.

5. The paperboard packaging laminate for a container in accordance with claim 2, wherein the compatibilizer is maleic anhydride modified polyethylene, metal neutralized ethylene methacrylic copolymer, ethylene acrylic acid copolymer, ethylene methacrylic acid copolymers, maleic anhydride modified polypropylene, epoxy functionalized polyethylene or epoxy functionalized polypropylene.

6. The paperboard packaging laminate for a container in accordance with claim 2, further comprising a layer of low density polyethylene polymer coated onto an uncoated side of the substrate, wherein the low density polyethylene polymer corresponds to an outside printed layer when the laminate is formed into the container.

7. The paperboard packaging laminate for a container in accordance with claim 2, the blend layer further comprising a filler selected from the group consisting of calcium carbonate, talc, mica, clay and combinations thereof.

8. The paperboard packaging laminate for a container in accordance with claim 1, wherein the blend layer is extrusion coated onto the paperboard substrate.

9. The paperboard packaging laminate for a container in accordance with claim 8, wherein the blend layer is dry blended prior to being added to an extrusion coater.

10. The paperboard packaging laminate for a container in accordance with claim 1, wherein the polyamide polymer is Nylon 6, Nylon 6-6, Nylon 6-10, amorphous nylon, or MXD6 Nylon.

11. The paperboard packaging laminate for a container in accordance with claim 1, further comprising a layer of low density polyethylene polymer coated onto an uncoated side of the substrate, wherein the low density polyethylene polymer corresponds to an outside printed layer when the laminate is formed into the container.

12. The paperboard packaging laminate for a container in accordance with claim 11, wherein the blend layer has a weight of approximately 25–30 lbs. per 3,000 square feet (approximately 41–49 grams per square meter); the substrate has a base weight of approximately 140–300 lbs. per 3,000 square foot (approximately 228–489 grams per square meter); and the outside printed layer has a weight of approximately 10–15 lbs. per 3,000 square foot (approximately 16–25 grams per square meter).

13. The paperboard packaging laminate for a container in accordance with claim 1, wherein the polyethylene polymer is low density polyethylene, high density polyethylene, metallocene polyethylene, or linear low density polyethylene.

14. The paperboard packaging laminate for a container in accordance with claim 1, the blend layer further comprising a filler selected from the group consisting of calcium carbonate, talc, mica, clay and combinations thereof.

15. A paperboard packaging laminate for a container comprising:
   a) a paperboard substrate having a weight of approximately 265 lbs. per 3,000 square foot (approximately 432 grams per square meter); and
   b) a blend layer, comprising approximately 65% by weight of a low density polyethylene, approximately 30% by weight of a Nylon 6 and 5% by weight of a maleic anhydride functionalized compatibilizer, extrusion coated onto one side of the substrate as the product contact layer, and having a weight of approximately 25–30 lbs. per 3,000 square foot (approximately 41–49 grams per square meter).

16. The paperboard packaging laminate for a container in accordance with claim 15, further comprising a layer of low density polyethylene extrusion coated onto an uncoated side the paperboard substrate as the outside printed layer and having a weight of approximately 10–15 lbs. per 3,000 square foot (approximately 16–25 grams per square meter).

17. A paperboard packaging laminate for a container comprising:
   a) a paperboard substrate; and
   b) a blend layer of a polyamide polymer and a polyethylene polymer coated onto said paperboard substrate, wherein the blend layer corresponds to an exterior layer when the laminate is formed into the container.

* * * * *